M. BOUZO.
COLTER.
APPLICATION FILED APR. 12, 1916.
1,221,503.
Patented Apr. 3, 1917.
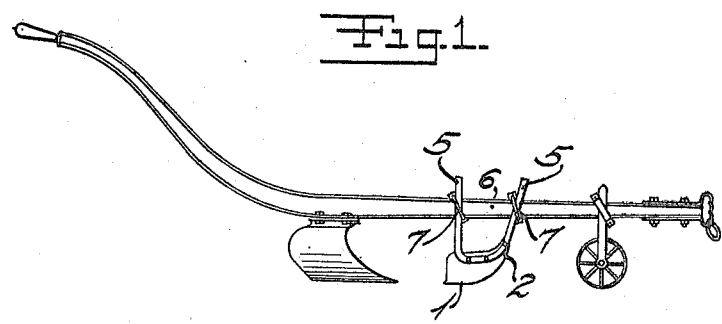
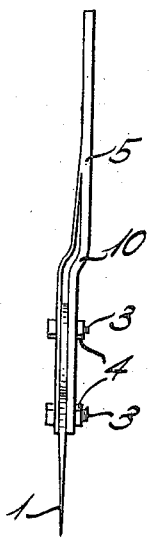
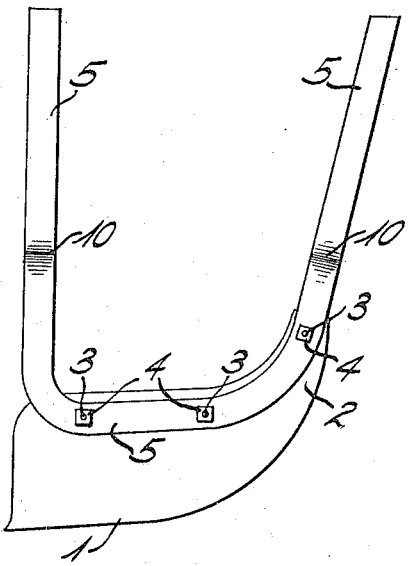
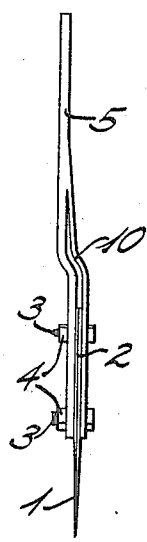
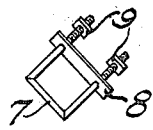
Inventor
Manuel Bouzo
By his Attorney

UNITED STATES PATENT OFFICE.

MANUEL BOUZO, OF HABANA, CUBA.

COLTER.

1,221,503.  Specification of Letters Patent.  Patented Apr. 3, 1917.

Application filed April 12, 1916.  Serial No. 90,551.

*To all whom it may concern:*

Be it known that I, MANUEL BOUZO, a citizen of the Republic of Cuba, residing at No. 67 O'Reilly street, Habana, Cuba, have invented new and useful Improvements in Colters, of which the following is a specification.

The object of the invention is to provide a colter, which may be detachably secured to the beam of a plow and whose lower edge is maintained at the same height as the point or tip of the plow share of the plow to which it is attached. A further object is to provide a colter having an upwardly curved rounded forward edge adapted to easily cut vines and roots in the soil at the depth at which the share may be set.

The invention consists of the construction, combination and arrangement of parts, as herein illustrated, described and claimed.

In the accompanying drawings, forming part hereof, is illustrated a form of embodiment of the invention, in which drawings similar reference characters designate corresponding parts, and in which:

Figure 1 is a side elevation of the plow showing the attachment of the invention;

Fig. 2 is a side elevation of the colter;

Fig. 3 is an edge elevation of the colter;

Fig. 4 is an edge elevation of the opposite end of the colter shown in Fig. 3; and Fig. 5 is a perspective of one of the clips used for adjustably securing the colter to the plow beam.

Referring to the drawings, 1 designates a blade or colter proper, having an upwardly curved forward end, terminating in a plane rear portion. The upper curved forward portion is indicated by the numeral 2.

By means of bolts 3 and nuts 4, the blade 1 is secured in the bifurcation of the lower part of a U-shaped supporting member, having two substantially vertical arms 5 formed integrally therewith.

The colter is mounted in a vertical position by means of U-shaped clips 7 and plates 8, to receive the ends of the clips and nuts 9. By this construction, the colter is adjustably and securely held on the beam at any desired height.

The arms 5 are offset at 10, as best shown in Fig. 4, and in the operation of the invention, the height at which the colter is set is such that its lower end remains at approximately the same height as the tip of the plow share, so that it may penetrate into the soil to the same depth.

I claim—

1. An attachment for plows including a beam, comprising a U-shaped supporting member having two substantially vertical arms and an integrally formed, longitudinally disposed connecting member, U-shaped clips for detachably securing the arms to the plow beam, said supporting member being bifurcated below the point of attachment to the plow beam, a blade, and a plurality of nuts and bolts to detachably secure the blade within the bifurcation, said blade having its greatest width at its rear portion and being narrower and curved upwardly at its front portion.

2. An attachment for plows including a beam, comprising a supporting member including two upwardly directed arms for detachable connection to the plow beam, said arms being connected together by a horizontally disposed member formed integrally therewith, said connecting member and vertical arms being bifurcated below the point of attachment to the plow beam, and a blade detachably secured within said bifurcation, the aforesaid arms being offset intermediate their length whereby said blade is disposed in vertical alinement with said plow beam.

In testimony whereof I have signed my name to this specification in the presence of two subscribing witnesses.

MANUEL BOUZO.

Witnesses:
RAOUL F. WASHINGTON,
GABRIEL M. MALY.

Copies of this patent may be obtained for five cents each, by addressing the "Commissioner of Patents, Washington, D. C."